JOHN V. FOSTER
INVENTOR.

ATTORNEYS

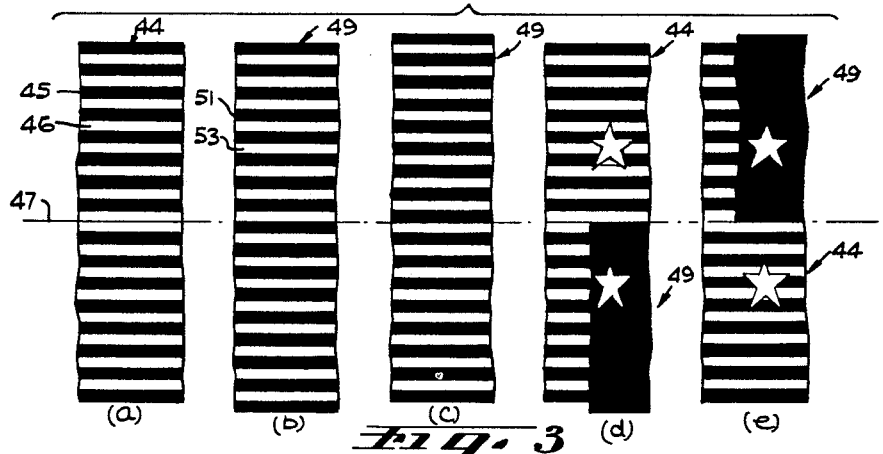
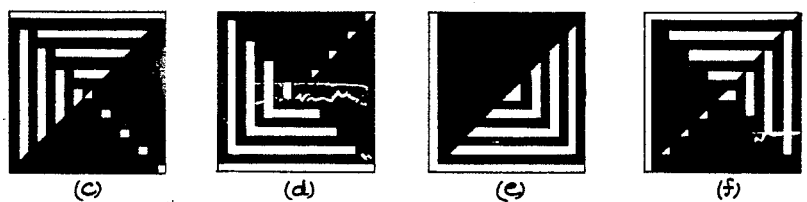
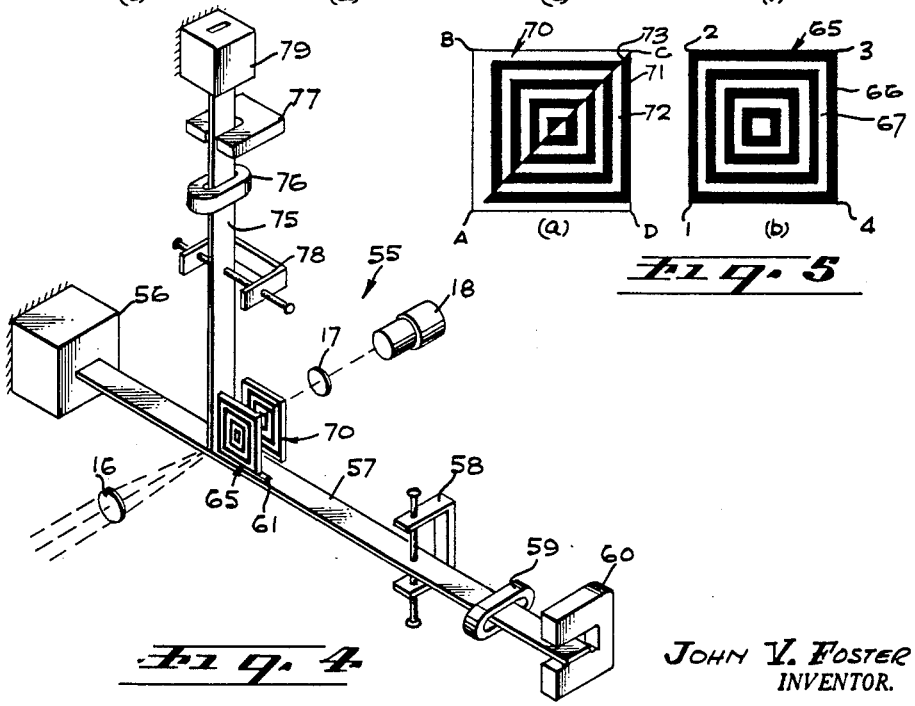

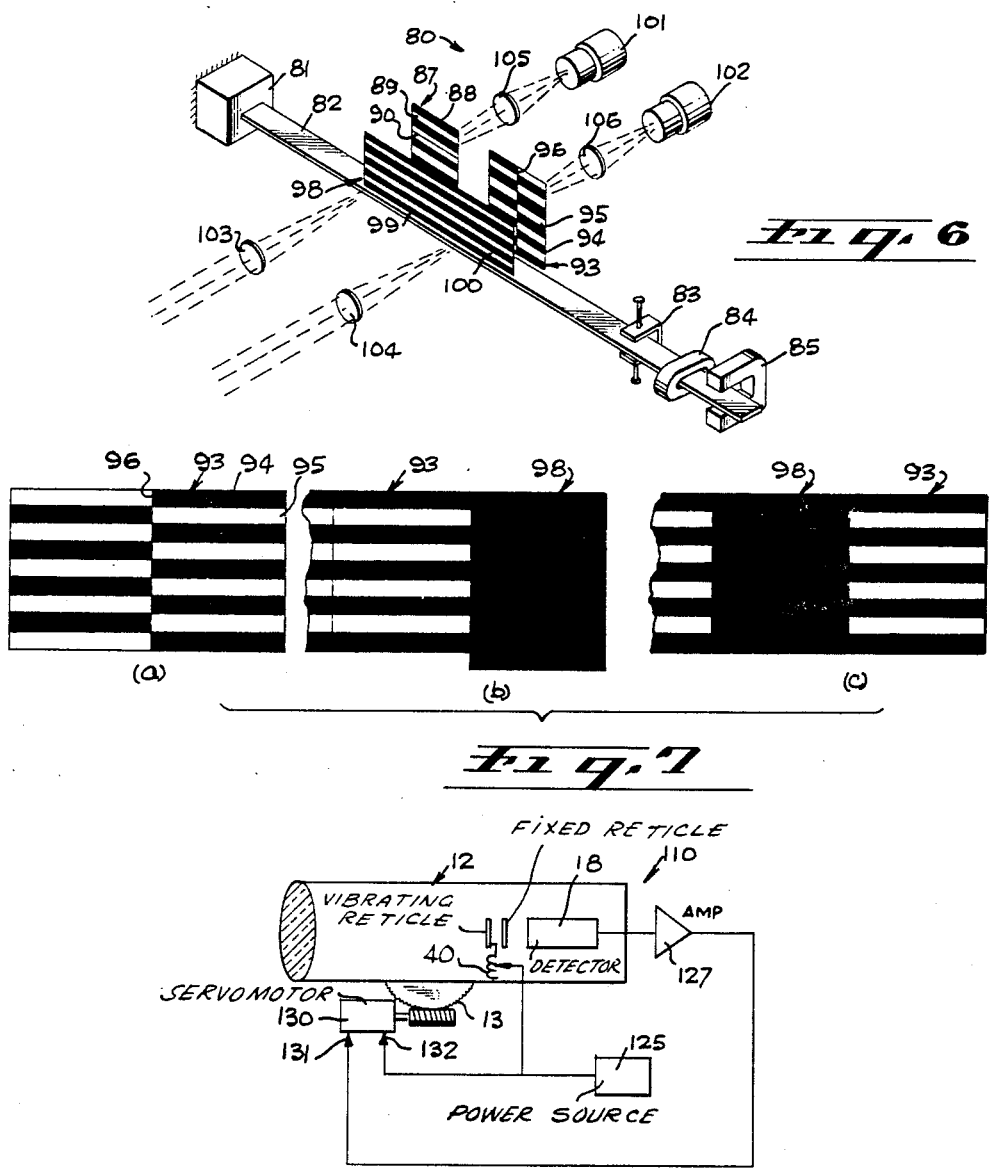

United States Patent Office 3,219,828
Patented Nov. 23, 1965

3,219,828
VIBRATING RETICLE STAR TRACKER
John V. Foster, Los Altos, Calif., assignor to the United States of America as represented by the National Aeronautics and Space Administration
Filed Mar. 22, 1962, Ser. No. 181,827
9 Claims. (Cl. 250—203)
(Granted under Title 35, U.S. Code (1952), sec. 266)

The invention described herein may be manufactured and used by and for the Government of the United States of America for governmental purposes without the payment of any royalties thereon or therefor.

This invention relates to a star tracker, and more particularly to a star tracker having a vibrating reticle.

Most prior art star trackers have used one of two methods for tracking. One of the methods utilizes a rotating half disc which interrupts the light from the star at the telescope focal plane. By detecting the shutter position when the light is allowed to pass the shutter, and when it is blocked by the shutter, a signal is generated for driving the telescope. The other method used includes a nutating or wobbling mirror to move the star image over a fixed reticle in a circular or square pattern. Signals generated by motion of the star image over the reticle can be used to center the telescope.

The above-mentioned tracking methods have various disadvantages. One disadvantage is that these systems require excessive power. This is an important consideration, particularly in space travel, since optimum utilization of power is of primary importance. Another disadvantage of the prior art system is that they have a rather limited life span. This again is an important consideration in existing spacecraft, since when a spacecraft is in flight the facilities for replacement or repair at the present time are nonexistant. Thus, it is important that the star tracker provide maintenance free operation over a long time interval. A further problem in prior art methods is that of stability. The center position of most scanners depend on the stability of a moving device. After numerous scanning movements the center position is subject to change, seriously affecting the accuracy of the scanner, which in turn also affects the useful life of the device.

The present invention overcomes many of these difficulties. Scanning is accomplished by a vibrating arrangement having a power requirement which is a fraction of prior art devices. Due to a novel reticle arrangement, very small movement is necessary to provide scanning, further reducing the power required. Because of these two features, it follows, that the life span of the star tracker will be increased. In this invention the center line reference is fixed with respect to the telescope. Therefore, the center position of the scanner does not depend on the stability of a moving device and is, therefore, not subject to the misalignment of prior are devices.

It is therefore an object of this invention to provide a vibrating reticle star tracker which has an expanded operating life.

Still another object of this invention is to provide a reticle star tracker which utilizes vibrating mechanism for scanning purposes.

Yet another object of this invention is to provide a star tracker having a scanner which can be limited to a very small motion regardless of the size of the field covered.

Another object of this invention is to provide a star tracker whose accuracy is substantially independent of the size of the field scanned.

Yet another object of this invention is to provide a star tracker which passes light from the star over a whole half field instead of examining parts of the field in sequence.

Still another object of this invention is to provide a star tracker wherein the center position of the scanner does not depend on the stability of a moving device.

Yet another object of this invention is to provide a star tracker wherein scanner motion in a single plane will produce signals to provide telescope correction about two axes.

These and other objects of this invention will become more apparent upon reading the specification in conjunction with the accompanying drawings.

In the drawings:

FIG. 3 is a fragmentary, elevational view, of the fixed and movable reticles, showing an operating sequence;

FIG. 4 is a perspective view of a modified form of fixed and movable reticles and the vibrating mechanism therefor;

FIG. 5 is an elevational view of the fixed and movable reticles of FIG. 4, also showing an operating sequence;

FIG. 6 is a perspective view of yet another embodiment of fixed and vibrating recticles and the vibrating mechanism therefor;

FIG. 7 is an elevational view of one of the fixed reticles and the movable reticle of the embodiment of FIG. 6, also showing an operating sequence;

FIG. 8 is a schematic view of a star tracker system showing another arrangement for driving the telescope.

Basically, this invention relates to a star tracker which utilizes a fixed and vibrating reticle for scanning purposes. The fixed reticle is mounted in the focal plane of the telescope. The movable reticle is fixed to a reed anchored at one end, but otherwise free to vibrate. The movable reticle is located parallel to the focal plane of the fixed recticle, but displaced so that the two surfaces are at least a few thousands of an inch apart. One of the reticles has a series of opaque and clear lines, the lines in the one segment of the reticle being disposed oppositely to the lines in the other segment. The other reticle has a series of clear and opaque lines throughout. Mechanism is provided for driving the movable reticle, in its plane, perpendicular to the direction of the reticle lines by an amount of one line width. The star image is focused to a point or to a small circle covering a few lines at the focal plane located at the reticles. Light from the star passes through the reticles to a detector depending on its position with respect to the reticles, and the position of the movable reticle with respect to a fixed reticle. If the image is above a reference line on the reticle having the oppositely disposed clear and opaque lines, and the other reticle is positioned such that the clear and opaque lines of the reticles match, light passes to the detector. Otherwise, light is blocked and will pass when the clear and opaque lines of the reticles match below the reference line. This signal is compared with a reference signal and provides a signal of appropriate polarity to drive a motor connected with the telescope for centering the telescope. This principle is utilized with different reticle arrangements to provide centering of the telescope about multiple axes of movement.

Figure 1:
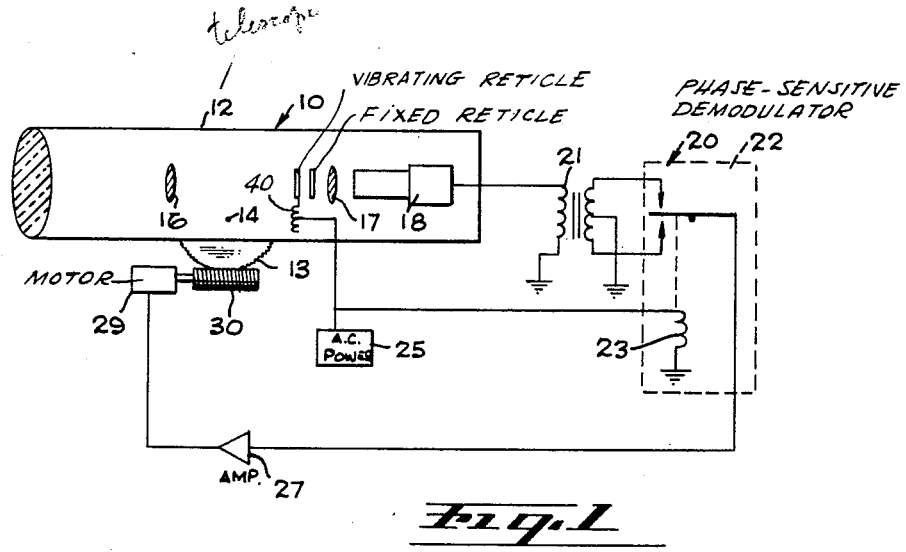
FIG. 1 is a schematic view of one embodiment of the vibrating reticle star tracker

Referring now more specifically to the details of the invention, FIG. 1 best shows the basic vibrating reticle star tracker system designated generally 10. The system 10 includes a telescope 12 having a gear train 13 which is utilized to move the telescope about trunnions 14 appropriately journaled on the aircraft or spacecraft. The telescope 12 has an objective lens 16 and a field lens 17 placed fore and aft respectively, of the reticles to be explained more fully hereinafter. The telescope 12 also houses a detector or photomultiplier 18 of conventional design.

The detector 18 is electrically connected to a phase-sensitive demodulator 20 best illustrated in FIG. 1. It is one of several standard devices for phase-sensitive demodulation including a center tap transformer 21, a chopper 22, and chopper drive coil 23. The drive coil 23 is electrically connected to an A.C. power source 25.

The output of the chopper is connected to an amplifier 27 which in turn is connected to a D.C. drive motor 29. The motor 29, through a worm 30, drives telescope gear train 13 to position the telescope 12.

Figure 2:
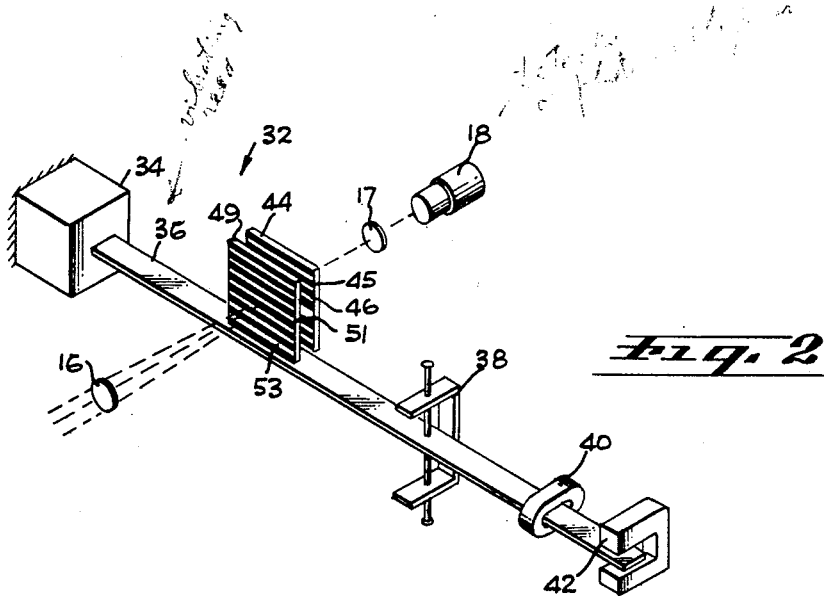
FIG. 2 is a perspective view showing the reticles and mechanism for vibrating and limiting movement of the vibrating reticle.

The vibrating assembly, designated generally as 32, is best shown in FIG. 2. The assembly 32 includes an anchor 34, that may be the side of the telescope, to which one end of a vibrating reed 36 is fixed. A reed drive coil 40, of conventional design, surrounds the other end of the reed and is electrically connected with the A.C. power source 25. The extreme free end of the vibrating reed 36 is positioned between the poles of a directional magnet 42. The magnet 42 is illustrated as a permanent magnet, however, it is to be understood that it also may be an electromagnet. The current induced in the reed-drive coil 40 will induce a magnetic field in the vibrating reed 36 which will cause it to be attracted to the opposite pole of the magnet. The A.C. drive coil 40 and the directional magnet 42 are thus utilized to vibrate the reed 36.

The free end of the reed 36 is also located within an adjustable stop 38, the frame of which is fixed to the telescope. The adjustable stop 38 is of conventional design, having a U-shaped frame with oppositely disposed screws threaded through the projecting legs of the frame. The vibrating reed 36 operates between the ends of the screws which limit the degree of movement thereof.

Affixed to the telescope 12 by appropriate support structure, and located in a plane parallel to the vibrating reed 36, as well as being situated in the focal plane of the telescope, is a fixed reticle 44 (FIGS. 2 and 3). It is made of a light transmitting substance, but has a pattern of opaque and clear areas 45 and 46 respectively, illustrated as lines of substantial and equal width. The opaque and clear areas are segmented by a center line of 47. The opaque and clear areas in one segment being oppositely disposed to the opaque and clear areas in the other segment. This arrangement results in a double clear area at the center line 47 as is clearly illustrated in FIG. 3(a).

Rigidly attached to the vibrating reed 36 is the vibrating or moving reticle 49 (FIGS. 2 and 3). It is positioned parallel to an immediately adjacent the fixed reticle 44, being displaced so that the two surfaces are a few thousandths of an inch apart. The moving reticle 49 also has a pattern of opaque and clear areas 51 and 53 respectively. These areas are illustrated as lines of substantial width and equal dimension and extend throughout the vibrating reticle. Areas 51 and 53 are the same width as areas 45 and 46 and are alternately disposed along the entire length of reticle 49. As a result, in reticle 49 there is no symmetry about center line 47 as in reticle 44. The vibrating reed 36 is driven by the reed drive coil 40 and directional magnet 42 perpendicular to the direction of the reticle lines by an amount of one line width as is determined by adjustable stop 38. The purpose for this will be explained more fully hereinafter in the operation description.

FIG. 4 shows a modified vibrating assembly. It utilizes the basic ideas of assembly 32; however, provides for multidirectional movement of the vibrating reticle.

In assembly 55 the up-down (U-D) vibrating reed 57 is fixed at one end to anchor 56. An U-D reed drive coil 59 surrounds the free end of the reed which is also located between the poles of a directional magnet 60. The amount of movement of the vibrating reed 57 is limited by the adjustable stop 58.

The U-D vibrating reed 57 has a guide track 61 in which the bottom of moving recticle 65 is slidably anchored by a T-bar and slot arrangement. The moving reticle 65 is thus capable of moving longitudinally of the U-D vibrating reed 57, but is carried in a perpendicular direction therewith when vibrated. It has a pattern of opaque and clear areas 66 and 67 respectively. These areas are in the form of square, frame-like lines of substantial width with the frames progressively increase in size from a square, clear middle to the outside of the reticle as shown in FIG. 5(b).

A fixed reticle 70 is located adjacent the vibrating reticle 65 in a manner similar to the reticle arrangement of assembly 32. It has opaque and clear areas 71 and 72 respectively. These areas are similar to the design of the areas of vibrating reticle 65, except that the opaque areas in one segment of the reticle are opposed to the clear areas in the other segment and vice versa (FIG. 5(a)). The fixed reticle 70 is segmented along a diagonal dividing line 73 thus dividing the opaque and clear areas into generally L-shaped lines.

Fixed to the side edge of vibrating reticle 65 is a horizontal or left-right (L-R) vibrating reed 75. A L-R reed drive coil 76 surrounds the other end of the reed which is also located between the poles of an L-R directional magnet 77. This end is restrained by anchor 79 which prevents reed 75 from moving in all directions except up and down. The extent of movement of the L-R vibrating reed 75 is limited by the L-R adjustable stop 78. With this arrangement it can be seen that the vibrating reticle 65 can be moved in one direction by U-D vibrating reed 57 and in a direction perpendicular thereto by L-R vibrating reed 75. The purpose for the multidirection movement of vibrating reticle 65 will be explained more fully hereinafter.

FIG. 6 illustrates still another embodiment of the vibrating assembly, designated generally as 80. The assembly 80 includes a vibrating reed 82 which is fixed at one end to an anchor 81. The free end of the vibrating reed 82 is surrounded by a drive coil 84 and is positioned between the poles of a directional magnet 85. It is limited in movement by an adjustable stop 83. These items are all similar in design to those explained in previous embodiments, therefore, they will not be explained in greater detail.

A fixed verticle reticle 87 having opaque and clear areas 88 and 89 respectively, and a center line 90 is situated in the focal plane of the telescope. This reticle is identical in design to the fixed reticle of assembly 32 and will not again be explained.

A fixed horizontal reticle 93 is situated at the side of and in the same plane as the fixed vertical reticle 87. The horizontal fixed reticle has opaque and clear areas 94 and 95. The horizontal fixed reticle is segmented along a dividing 96 line such that the opaque and clear areas are oppositely disposed or staggered in one segment from those in the other segment as clearly illustrated in FIG. 7(a).

A vibrating reticle 98 is fixed to the vibrating reed 82. It has a pattern of opaque and clear lines 99 and 100 respectively which is identical in design to the vibrating reticle 49 of assembly 32. It differs in that it is much wider, being of sufficient width to overshadow both the vertical reticle 87 and the horizontal reticle 93 as shown in FIG. 6.

With this embodiment two objective lenses, one 103 and the other 104, and two field lenses 105 and 106 are utilized. The objective lenses are placed side by side as are the field lenses, the objective lens 103 cooperating with the field lens 105, and the objective lens 104 cooperating with the field lens 106. Two detectors or photomultipliers 101 and 102 are also utilized with this embodiment, the detector 101 indicating vertical error, and the detector 102 indicating a horizontal error in a manner which will be explained more fully subsequently.

FIG. 8 shows a modified form of reticle star tracker system designated generally as 110. The system 110 shows a different arrangement for driving the telescope 12. The signal from the detector 18, or equivalent, is fed directly into an A.C. amplifier 127 instead of into a demodulator 20 as in system 10. The amplifier is connected directly to the control winding 131 of a standard A.C. servomotor 130. An A.C. power source 125 is connected with the reference winding 132 of the servomotor 130. The output of the servomotor 130 is connected to the gear train 13 of the telescope 12 which is used for positioning. The A.C. power source supplies a reference signal to the reference winding 132. A variable voltage signal from the detector 18 of the same frequency as the reference signal, but of either in-phase or out-of-phase polarity, is supplied to the control winding 131. An in-phase signal drives the motor one way and the out-of-phase signal the opposite direction.

Operation

Each of the vibrating assemblies 32, 55 and 80 are designed to be used with the star tracker systems 10 or 110. The systems 10 and 110 differing in the manner in which the signal from the demodulator is utilized to drive the telescope. To illustrate the basic principle of operation, the system 10 will be explained in conjunction with vibrating assembly 32.

In explaining the operation it is assumed that the telescope is directed such that a light from a reference star is seen by the objective lens 16. This light is focused upon the moving reticle 49. Current from the A.C. power supply 25 flows in the reed drive coil 40 and produces a magnetic field in the iron vibrating reed 36. If the current makes the end of the vibrating reed near the magnet into a north pole, the reed will pull down toward the fixed magnet south pole. If the current direction is reversed the reed becomes south and pulls up toward the north pole. Thus, an A.C. signal applied to the coil will cause the reed to be alternately driven up and down carrying the reticle with its resulting in a vibrating movement. The mechanical stop 38 limits the moving reticle 49 motion to exactly one line width of the reticle pattern. Whether the star light passes through the moving reticle 49 and fixed reticle 44 to the detector depends upon its position on the reticles and the position of the moving reticle as is shown in FIG. 2. When the moving reticle is in position 3(b), and placed over the fixed reticle as in 3(d), the light passing situation is as shown. A star image located anywhere above the center line 47 will have half its light passed on to the detector. A star image located anywhere below the center line 47 will be completely blocked. On the alternate half of the cycle, when the moving reticle 49 is in position 3(c) the situation is as shown on 3(e) with a star image anywhere below center line 47 passing and above being blocked. The circuit is arranged such that if the star image is above the center line 47 the output signal from the detector 18 will be 180° out of phase with the current of reed drive coil 40. If the star image is below the center line 47 the detector output will be in phase with the reed drive coil current. This signal is fed to the phase-sensitive demodulator 20 which provides a plus or minus output depending on the phase of the signal from the detector. This signal is fed through the D.C. amplifier 27 and to the D.C. motor 29 which drives in one direction for plus and in the other direction for minus. The gear train 13 is driven to raise or lower the telescope to center the star image at which point the output from the detector is neither plus or minus, shutting down the motor 29.

The vibrator assembly 55 operates in essentially the same manner as assembly 32; however, the moving reticle 65 is driven both horizontally and vertically thereby providing a drive signal about two axes. The moving reticle 65 is driven by U-D reed drive coil 59 and directional magnet 60, and L-R reed drive coil 76 and directional magnet 77 so that in a time sequence it moves in a direction to put point 1 on A, then up one line width so that point 2 is on B, then right one line width so that point 3 is on C, then down one line width so that point 4 is on D, then repeat point 1 on A, et cetera. In other words, the moving reticle 65 is driven in a small square equal to one line width by one line width. FIG. 5(c) shows the condition when the moving reticle 65 is over the fixed reticle 70 (1 on A). The light from a star image in the upper and left quadrants could pass, the right and lower could not. FIGS. 5(d), 5(e), and 5(f) show the other three positions. It can be seen that if the moving reticle 65 were driven in sequence to conditions 5(c), 5(d), 5(e), 5(f), 5(c), et cetera, then a pulse would be produced at the detector as follows: If the star image is on the lower quadrant at pulse time 5(d), if the star image is on the right quadrant at pulse time 5(e), if the star image is on the upper quadrant at pulse time 5(f). Thus, a demodulator which has the same reference signal as the reticle drives would generate left-right, up-down, drive signals using these reticles. These signals are utilized to drive D.C. motors mechanically connected to the telescope to elevate and lower the telescope as well as position it to the right or left. This arrangement is essentially the same as the tracker system 10, with an additional circuit added or the circuit modified to provide the left-right drive signal. These pulses could also be utilized to drive a left-right, up-down servo motor in a system similar to that of 110 illustrated in FIG. 8.

The vibrator assembly 80, like the assembly 55, provides for correction about two axes. The moving reticle 98 is moved by vibrating reed 82 when it is driven by reed drive coil 84 and directional magnet 85. The vertical fixed reticle 87 cooperating with the moving reticle 98 provides error signals in a manner similar to that of vibrator system 32. Therefore, this operation will not again be explained in detail. In addition, however, the horizontal fixed reticle 93 cooperating with the moving reticle 98 provides left-right error signals. When the moving reticle 98 is in the FIG. 7(b) position and placed over the horizontal fixed reticle 93 so that the opaque lines of 98 coincide with the opaque lines on the left side of 93, the light passing situation is as shown. The star image located anywhere to the left of the dividing line 96 will have half its light passed on to the detector. If the star image is located anywhere to the right of the dividing line it will be completely blocked. On the alternative half of the cycle, when the moving reticle 98 is in the FIG. 7(c) position so that the opaque lines of 98 coincide with the opaque lines of the right side of 93 the situation is such that a star image on the right side of the dividing line will pass, and anything on the left side of the center line will be blocked. The signals from the detector can be fed to demodulators such as used in system 10 or to servomotors such as used in system 110. As is shown in FIG. 6 a light detector 101 is used for the vertical error and a light detector 102 for the horizontal error, it being understood that a demodulator circuit et cetera, or servosystem must be connected to each.

From the above description it is apparent that the invention has many advantages over the prior art. Because of the small movement required by the vibrating reticles (on the order of .001 to .005 inch) very little drive power is required for the image scanner mechanism. The motion of the scanner is limited to one line width which is a very small portion of the entire field of view. This is in contrast to most prior art scanners which have motion covering the entire field. In this device, the center line reference is fixed by the fixed reticle double clear space position. The center position of previous scanners depends upon the stability of a moving device rather than a fixed reference. The life of this invention can be made to exceed the life of most other basic types due to the fact that it is powered by a vibrator.

It will be apparent from the above description that many modifications are possible in the light of the above teaching. It is, therefore, to be understood that within the scope of the appended claims the invention may be practiced otherwise than as specifically described herein.

What is claimed is:

1. A double-axis light source tracker comprising: an optical instrument having a focal plane and an optical axis; a pair of reticles in face-to-face relationship located in said focal plane; one of said reticles being fixed, the other movable; means for vibrating said movable reticle about two orthogonal axes, said vibrating reticle causing light in said focal plane to be modulated in accordance with the orthogonal positions of the light; means for detecting light energy in said focal plane, and servo means connected to said instrument, reticles, vibrating means and detecting means for moving said optical axis in double-axis alignment with a detected light source.

2. A vibrating reticle star tracker comprising: a telescope, a fixed reticle mounted in the focal plane of said telescope, said fixed reticle having alternate clear and opaque lines, the lines in one segment being oppositely disposed to the lines in another segment, a movable reticle mounted on a reed adjacent said fixed reticle, said movable reticle having alternate clear and opaque lines throughout, said reed having one end anchored in said telescope, stop means for limiting the movement of said reed to one line width of said reticle, electrical drive means having a varying potential for vibrating said reed, the opaque lines of said movable reticle alternately covering and uncovering the clear lines of said fixed reticle segments, the light from a source passing through the clear lines of one of said segments and being blocked by the other segment depending on the position of said light source with respect to said reticles, photosensitive means for detecting the light from said source, a signal produced by said photosensitive means being fed to a phase-sensitive demodulator connected with said electrical drive means having a varying potential, said demodulator providing a drive signal through an amplifier of appropriate polarity to operate a motor; and mechanism interconnected with said telescope driven by said motor to center said telescope with respect to said light source.

3. A vibrating reticle star tracker comprising; a telescope; a fixed reticle mounted in the focal plane of said telescope said fixed reticle having a segment of alternate L-shaped clear and opaque lines occupying two adjacent quadrants and another segment of alternate L-shaped clear and opaque lines staggered with respect to said first mentioned lines occupying two adjacent quadrants; a movable reticle slidably mounted on a first reed positioned adjacent said fixed reticle, said movable reticle having frame-like alternate clear and opaque lines; a second reed fixed to said movable reticle generally transverse of said first reed; stop means for limiting the movement of said reeds to one line width of said reticle; electrical drive means having a varying potential for sequentially vibrating said reeds, the opaque lines of said movable reticle alternately covering and uncovering the clear lines of said fixed reticle quadrants, light from a source passing through the clear lines of one of said quadrants and being blocked by the other quadrants depending on the position of said light source with respect to said reticle; photosensitive means for detecting the light from said source, signals produced by said photosensitive means fed to a phase-sensitive demodulator connected with said electrical drive means; motor and gear means receiving signals of appropriate polarity from said phase-sensitive demodulator and being connected with said telescope to center said telescope with respect to said light source about two axes.

4. A vibrating reticle star tracker comprising: first and second fixed reticles mounted in the focal plane of said telscope, said first fixed reticle having alternate clear and opaque lines, the lines in one segment being oppositely disposed to the lines in another segment, said second fixed reticle having alternate clear and opaque lines, the lines in one segment being staggered with respect to the lines in another segment; a movable reticle mounted on a reed adjacent said fixed reticles, said movable reticle having alternate clear and opaque lines throughout, said reed having one end anchored in said telescope; stop means for limiting the movement of said reed to one line width of said reticles; electrical drive means having a varying potential vibrating said reed, the opaque lines of said movable reticle alternately covering and uncovering the clear lines of said fixed reticle segments, the light from a source passing through the clear lines of certain of said segments and being blocked by the other segments depending on the position of said light source with respect to said reticles; photosensitive means for detecting the light from said source; phase-sensitive demodulators; means for coupling the output of said photosensitive means to said demodulators; means for coupling said electrical drive means to said demodulators; servo means electrically coupled to said demodulators and mechanically coupled to said telescope for centering said telescope with respect to said light source about at least two axes.

5. A vibrating star tracker as in claim 4 wherein said movable reticle overshadows both said first and second fixed reticles.

6. A double-axis light source tracker comprising: an optical instrument having a focal plane and an optical axis; a pair of reticles in face-to-face relationship located in said focal plane; one of said reticles being fixed the other movable; said reticles being planar and each having alternate clear and opaque square-shaped frames that are concentrically arranged; means for vibrating said movable reticle about two orthogonal axes, said vibrating reticle causing light in said focal plane to be modulated in accordance with the orthogonal positions of the light; means for detecting light energy in said focal plane; and servo means connected to said instrument, reticles, vibrating means and detecting means for moving said optical axis in double-axis alignment with a detected light source.

7. A vibrating reticle star tracker comprising, a telescope; a fixed reticle mounted in the focal plane of said telescope, said fixed reticle having alternate clear and opaque lines, the lines in one segment being oppositely disposed to the lines in another segment; a movable reticle mounted on a reed adjacent said fixed reticle, said movable reticle having alternate clear and opaque lines throughout, said reed having one end anchored in said telescope; stop means for limiting the movement of said reed to one line width of said reticle; electrical drive means providing a varying potential for vibrating said reed, the opaque lines of said movable reticle alternately covering and uncovering the clear lines of said fixed reticle segments, the light from a source passing through the clear lines of one of said segments and being blocked by the other segment depending on the position of said light source with respect to said reticles; photosensitive means for detecting the light from said source; amplifier means receiving a signal produced by said photosensitive means; and servomotor mechanism receiving signals from said amplifier and being interconnected with said telescope to center said telescope with respect to said light source.

8. A vibrating reticle star tracker comprising, a telescope; a fixed reticle mounted in the focal plane of said telescope, said fixed recticle having a segment of alternate L-shaped clear and opaque lines occupying two adjacent quadrants and another segment of alternate L-shaped clear and opaque lines staggered with respect to said first mentioned lines occupying the other two quadrants; a movable reticle slidably mounted on a first reed adjacent said fixed reticle, said movable reticle having frame-like alternate clear and opaque lines; a second reed fixed to said movable reticle generally transverse of said first reed; stop means for limiting the movement of said reeds to one line width of said reticle; electrical drive means having a varying potential for sequentially vibrating said reeds, the opaque lines of said movable reticle alternately covering and uncovering the clear lines of said fixed reticle quadrants, light from a source passing through the clear lines of one of said quadrants and being blocked by the other quadrants depending on the pisition of said light source with respect to said reticle; photosensitive means for detecting the light from said source; amplifier means receiving signals produced by said photosensitive means, servomotor means receiving signals from said amplifier and being connected with said telescope to center said telescope with respect to said light source about two axes.

9. A vibrating reticle star tracker comprising; a telescope; first and second fixed reticles mounted in the focal plane of said telescope, said first fixed reticle having alternate clear and opaque lines, the lines in one segment being oppositely disposed to the lines in another segment, said second fixed reticle having alternate clear and opaque lines, the lines in one segment being staggered with respect to the lines in another segment; a movable reticle mounted on a reed adjacent said fixed reticles, said movable reticle having alternate clear and opaque lines throughout, said reed having one end anchored in said telescope; stop means for limiting the movement of said reed to one line width of said reticles; electrical drive means having a varying potential vibrating said reed, the opaque lines of said movable reticle alternately covering and uncovering the clear lines of said fixed reticle segments, the light from a source passing through the clear lines of certain of said segments and being blocked by the other segments depending on the position of said light source with respect to said reticles; photosensitive means for detecting the light from said source; amplifier means receiving signals produced by said photosensitive means; servomotor means receiving signals from said amplifier means and being connected with said telescope to center said telescope with respect to said light source about two axes.

References Cited by the Examiner
UNITED STATES PATENTS

| | | | |
|---|---|---|---|
| 2,351,955 | 6/1944 | Graf | 250—237 X |
| 2,596,752 | 5/1952 | Williams | 88—14 X |
| 2,966,823 | 1/1961 | Trimble | 250—203 X |
| 2,997,595 | 8/1961 | Cary et al. | 250—203 |
| 3,004,169 | 10/1961 | Fairbanks et al. | 250—203 X |
| 3,007,053 | 10/1961 | Merlen | 250—203 |

RALPH G. NILSON, *Primary Examiner.*

WALTER STOLWEIN, *Examiner.*